(12) United States Patent  (10) Patent No.: US 8,842,298 B2
Jimenez  (45) Date of Patent: Sep. 23, 2014

(54) CAMERA ON MULTIFUNCTION PRINTER

(75) Inventor: Juan Manuel Jimenez, Escondido, CA (US)

(73) Assignee: Eastman Kodak Company, Rochester, NY (US)

( * ) Notice: Subject to any disclaimer, the term of this patent is extended or adjusted under 35 U.S.C. 154(b) by 48 days.

(21) Appl. No.: 13/482,007

(22) Filed: May 29, 2012

(65) Prior Publication Data

US 2013/0321829 A1  Dec. 5, 2013

(51) Int. Cl.
 *G06K 15/00*  (2006.01)
(52) U.S. Cl.
 USPC ......... 358/1.12; 358/1.15; 358/1.14; 358/1.9; 399/7
(58) Field of Classification Search
 USPC ............................... 358/1.15, 1.14, 1.9; 399/7
 See application file for complete search history.

(56) References Cited

U.S. PATENT DOCUMENTS

| 6,091,909 | A | 7/2000 | McIntyre et al. |
| 7,350,902 | B2 | 4/2008 | Dietl et al. |
| 2003/0076518 | A1* | 4/2003 | Miyake et al. ................. 358/1.9 |
| 2010/0060694 | A1* | 3/2010 | Saito et al. ...................... 347/19 |
| 2012/0044548 | A1 | 2/2012 | Schaertel et al. |

OTHER PUBLICATIONS

Kinoshita et al., Information Processor, Nov. 2, 2006, JP 2006304142 A.*

* cited by examiner

*Primary Examiner* — Benny Q Tieu
*Assistant Examiner* — Martin Mushambo
(74) *Attorney, Agent, or Firm* — Peyton C. Watkins (57) ABSTRACT

A multifunction printer includes an image capture apparatus including an image capture platform for holding an object of which an image is to be captured; a lid having a closed position in which the lid is proximate the image capture platform, and an open position in which the lid is away from the image capture platform; and a camera that is pivotably affixed to the lid; and a printing apparatus including: a media advance system for advancing a sheet of media to a print region; and a printhead.

16 Claims, 13 Drawing Sheets

CAMERA ON MULTIFUNCTION PRINTER

CROSS REFERENCE TO RELATED APPLICATIONS

Reference is made to commonly assigned, co-pending U.S. patent application Ser. No. 13/482,011, concurrently filed herewith, entitled "Method of Operating a Multifunction Printer with Camera" by Juan Jimenez, the disclosure of which is herein incorporated by reference.

FIELD OF THE INVENTION

The present invention relates generally to a multifunction printer having a camera, and more particularly to using the camera for both the image capture function and the printing function.

BACKGROUND OF THE INVENTION

A multifunction printer includes a printing apparatus and an image capture apparatus, such as an optical scanner for scanning or copying. Conventional optical scanners operate by imaging an object (e.g. a document) with a light source, and sensing a resultant light signal with an optical sensor array. A document or other object to be scanned is placed on top of a transparent platen below which the scanning optical sensor array, light source and optics are mounted. Each optical sensor or photoreceptor in the array produces a data signal representative of the intensity of light impinged thereon for a corresponding portion of the imaged object. The data signals from the array sensors are then processed (typically digitized) and stored in a temporary memory for subsequent manipulation and display or for printing on the associated printing apparatus in the multifunction printer. The image of the scanned object is projected onto the optical photosensor array incrementally by use of a moving scan line. The moving scan line is produced either by moving the document with respect to the scanner optical assembly or by moving the scanner optical assembly relative to the document.

Various types of photosensor devices may be used in optical scanners. One type of photosensor device is a charge-coupled device (CCD). A CCD builds up an electrical charge in response to exposure to light. The size of the electrical charge built up is dependent on the intensity and the duration of the light exposure. In optical scanners, CCD cells are aligned in a linear array. The length of the linear array is typically somewhat less than the length or width of the document scanning region. Each photoreceptor of the CCD has a portion of a scan line image impinged thereon as the scan line sweeps across the scanned object. The charge built up in each of the pixels is measured and discharged at regular sampling intervals. An image of a scan line portion of a document is projected onto the scanner's linear sensor array by scanner optics. In typical CCD scanners, the scanner optics include an imaging lens which typically reduces considerably the size of the projected image from its original size. The scanner optics provide good depth of field in such a CCD scanner.

A second type of scanner is the contact image sensor (CIS) scanner. A CIS scanner includes a contact image sensor having a length that is substantially equal to the width of the scanning region. The CIS has a short depth of field and is typically mounted beneath the transparent plate (scanner glass) upon which the document is placed. One or more rollers in the CIS carriage are biased against the bottom of the scanner glass so that the CIS is always at substantially the same distance from the top of the scanner glass.

In addition, although some printing jobs are sent from a host computer that is adjacent to the multifunction printer, other jobs are sent remotely over a network. When a user sends a printing job from a remote location, the user may not know whether or not the job was printed successfully.

Consequently, a need exists for a multifunction printer having an image capture apparatus including a camera configured in a fashion that is consistent with compact height. In addition it is advantageous if the camera can also be used to monitor the printing operation of the multifunction printer.

SUMMARY OF THE INVENTION

The present invention is directed to overcoming one or more of the problems set forth above. Briefly summarized, according to one aspect of the invention, the invention resides in a multifunction printer comprising: an image capture apparatus including: an image capture platform for holding an object of which an image is to be captured; a lid having a closed position in which the lid is proximate the image capture platform, and an open position in which the lid is away from the image capture platform; and a camera that is pivotably affixed to the lid; and a printing apparatus including: a media advance system for advancing a sheet of media to a print region; and a printhead.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
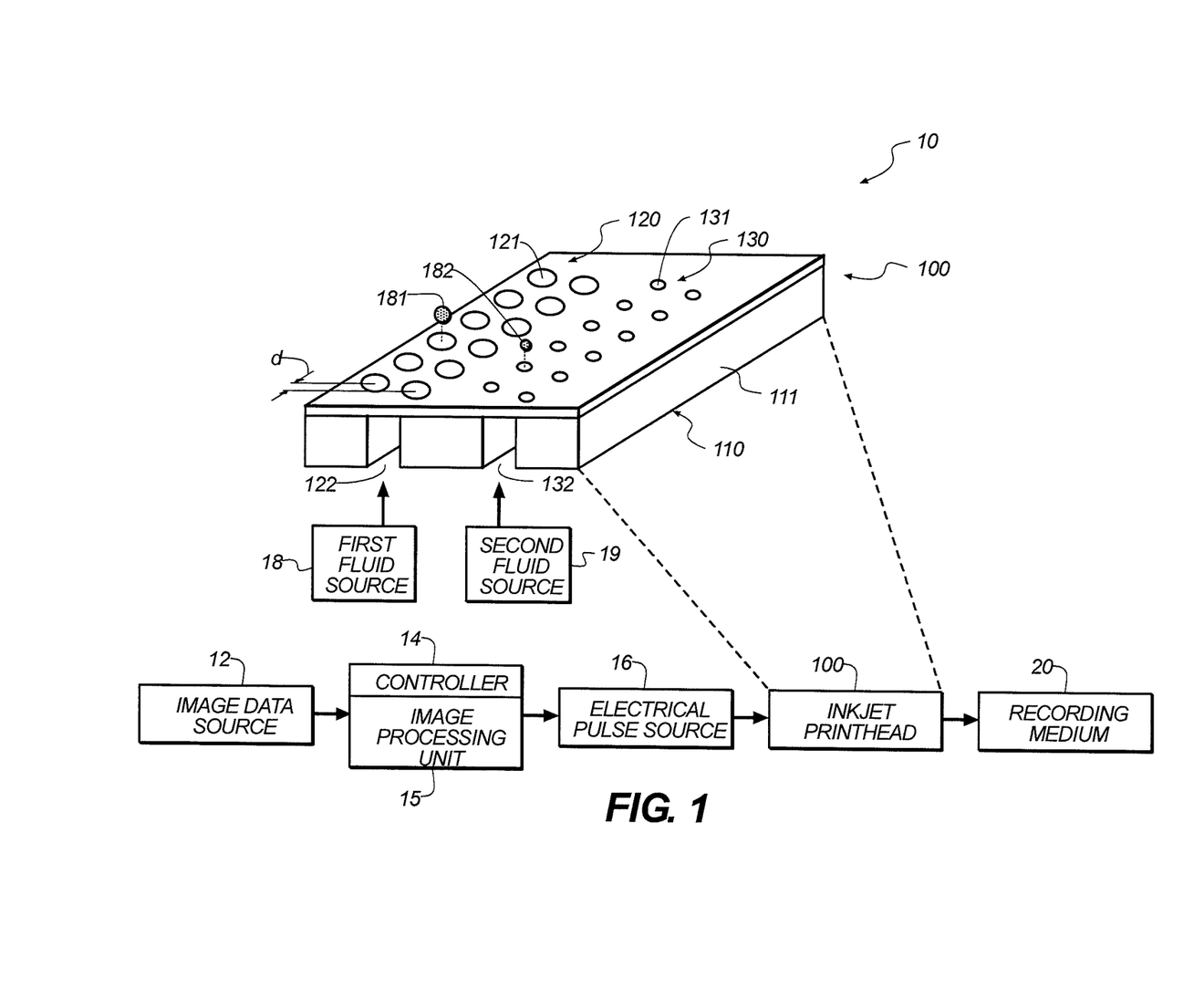
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. The inkjet printer system 10 includes an image data source 12, which provides data signals that are interpreted by a controller 14 as commands to eject drops. The controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays 120 and 130. Nozzles 121 in the first nozzle array 120 have a larger opening area than nozzles 131 in the second nozzle array 130. In this example, each of the two nozzle arrays 120 and 130 has two staggered rows of nozzles 121 and 131, each row having a nozzle density of 600 per inch. The effective nozzle density then in each nozzle array 120 and 130 is 1200 per inch (i.e. $d=\frac{1}{1200}$ inch in FIG. 1). If pixels on a recording medium 20 were sequentially numbered along the paper advance direction, the nozzles 121, 131 from one row of a nozzle array 120, 130 would print the odd numbered pixels, while the nozzles 121, 131 from the other row of the nozzle 120,130 array would print the even numbered pixels.

In fluid communication with each nozzle array 120 and 130 is a corresponding ink delivery pathway 122 and 132. The ink delivery pathway 122 is in fluid communication with the first nozzle array 120, and the ink delivery pathway 132 is in fluid communication with the second nozzle array 130. Portions of the ink delivery pathways 122 and 132 are shown in FIG. 1 as openings through printhead die substrate 111. One or more inkjet printhead die 110 will be included in the inkjet printhead 100, but for greater clarity only one inkjet printhead die 110 is shown in FIG. 1. In FIG. 1, a first fluid source 18 supplies ink to the first nozzle array 120 via the ink delivery pathway 122, and a second fluid source 19 supplies ink to the second nozzle array 130 via the ink delivery pathway 132. Although distinct fluid sources 18 and 19 are shown, in some applications it may be beneficial to have a single fluid source supplying ink to both the first nozzle array 120 and the second nozzle array 130 via the ink delivery pathways 122 and 132 respectively. Also, in some embodiments, fewer than two or more than two nozzle arrays 120 and 130 can be included on printhead die 110. In some embodiments, all nozzles on the inkjet printhead die 110 can be the same size, rather than having multiple sized nozzles on inkjet printhead die 110.

It is noted that the drop forming mechanisms associated with the nozzles are not shown in FIG. 1. The drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from the electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with first and second nozzle arrays 120 and 130 are also sized differently in order to optimize the drop ejection process for the different sized drops. During operation, droplets 181 and 183 of ink are deposited on a recording medium 20.

Figure 2:
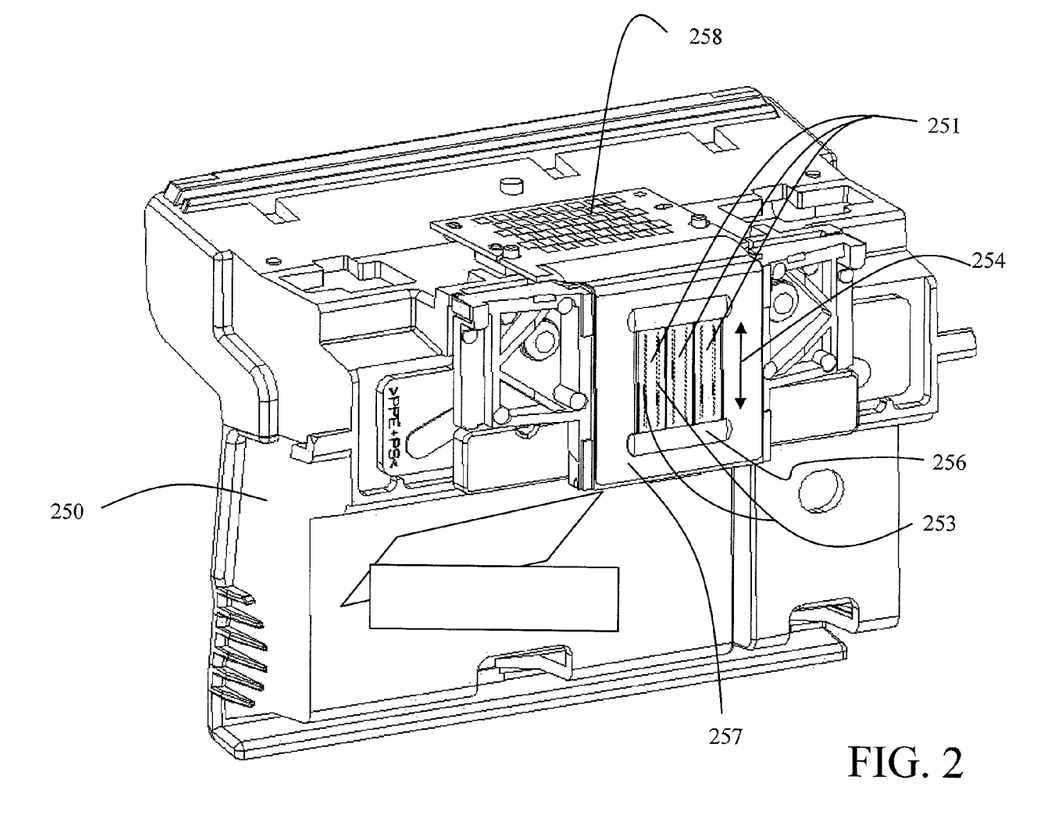
FIG. 2 is a perspective of a portion of a printhead.

FIG. 2 shows a perspective of a portion of a printhead 250, which is an example of the inkjet printhead 100. The printhead 250 includes three printhead die 251 (similar to printhead die 110 in FIG. 1), each printhead die 251 containing two nozzle arrays 253 so that printhead 250 contains six nozzle arrays 253 altogether. The six nozzle arrays 253 in this example can each be connected to separate ink sources (not shown in FIG. 2); such as cyan, magenta, yellow, text black, photo black, and a colorless protective printing fluid. Each of the six nozzle arrays 253 is disposed along a nozzle array direction 254, and the length of each nozzle array 253 along the nozzle array direction 254 is typically on the order of 1 inch or less. Typical lengths of recording media 20 are 6 inches for photographic prints (4 inches by 6 inches) or 11 inches for paper (8.5 by 11 inches). Thus, in order to print a full image, a number of swaths are successively printed while moving the printhead 250 across the recording medium 20. Following the printing of a swath, the recording medium 20 is advanced along a media advance direction that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. The flex circuit 257 bends around the side of the printhead 250 and connects to a connector board 258. When the printhead 250 is mounted into a carriage 200 (see FIG. 3), the connector board 258 is electrically connected to a connector (not shown) on the carriage 200 so that electrical signals can be transmitted to the printhead die 251.

Figure 3:
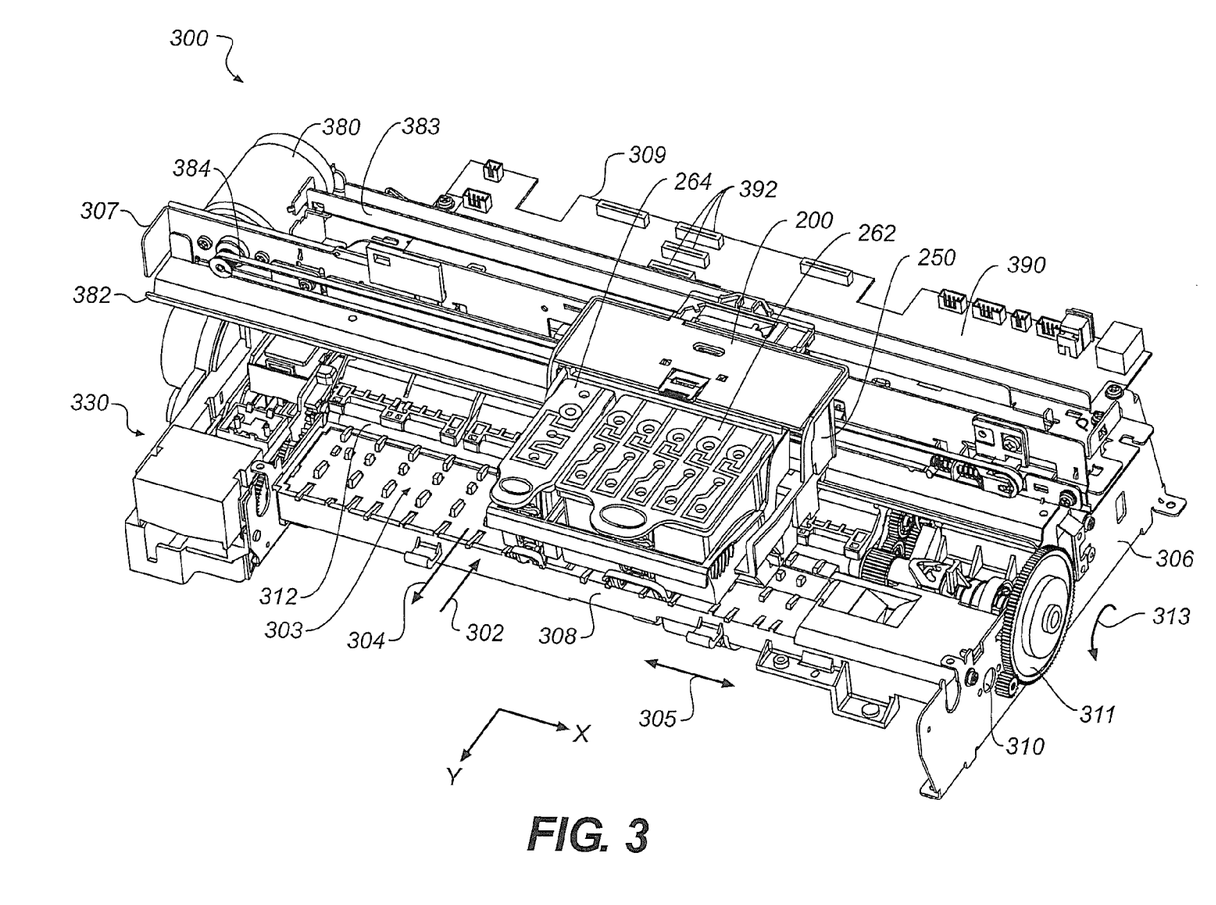
FIG. 3 is a perspective of a portion of a carriage printer.

FIG. 3 shows a portion of a desktop carriage printer. Some of the parts of the printer have been hidden in the view shown in FIG. 3 so that other parts can be more clearly seen. A printing mechanism 300 has a print region 303 across which the carriage 200 is moved back and forth in a carriage scan direction 305 along the X axis, between a right side 306 and a left side 307 of the printing mechanism 300, while drops are ejected from the printhead die 251 (not shown in FIG. 3) on the printhead 250 that is mounted on the carriage 200. A carriage motor 380 moves a belt 384 to move the carriage 200 along a carriage guide rail 382. An encoder sensor (not shown) is mounted on the carriage 200 and indicates carriage location relative to an encoder fence 383.

The printhead 250 is mounted in the carriage 200, and a multi-chamber ink supply 262 and a single-chamber ink supply 264 are mounted in the printhead 250. The mounting orientation of the printhead 250 is rotated relative to the view in FIG. 2 so that the printhead die 251 are located at the bottom side of the printhead 250, the droplets 181 and 182 of ink ejected downward onto the recording medium 20 (see FIG. 1) in the print region 303 in the view of FIG. 3. The multi-chamber ink supply 262, in this example, contains five ink sources: cyan, magenta, yellow, photo black, and colorless protective fluid; while the single-chamber ink supply 264 contains the ink source for text black. Paper or other recording medium 20 (sometimes generically referred to as paper or media herein) is loaded along paper load entry direction 302 toward a front of the printing mechanism 308.

Figure 4:
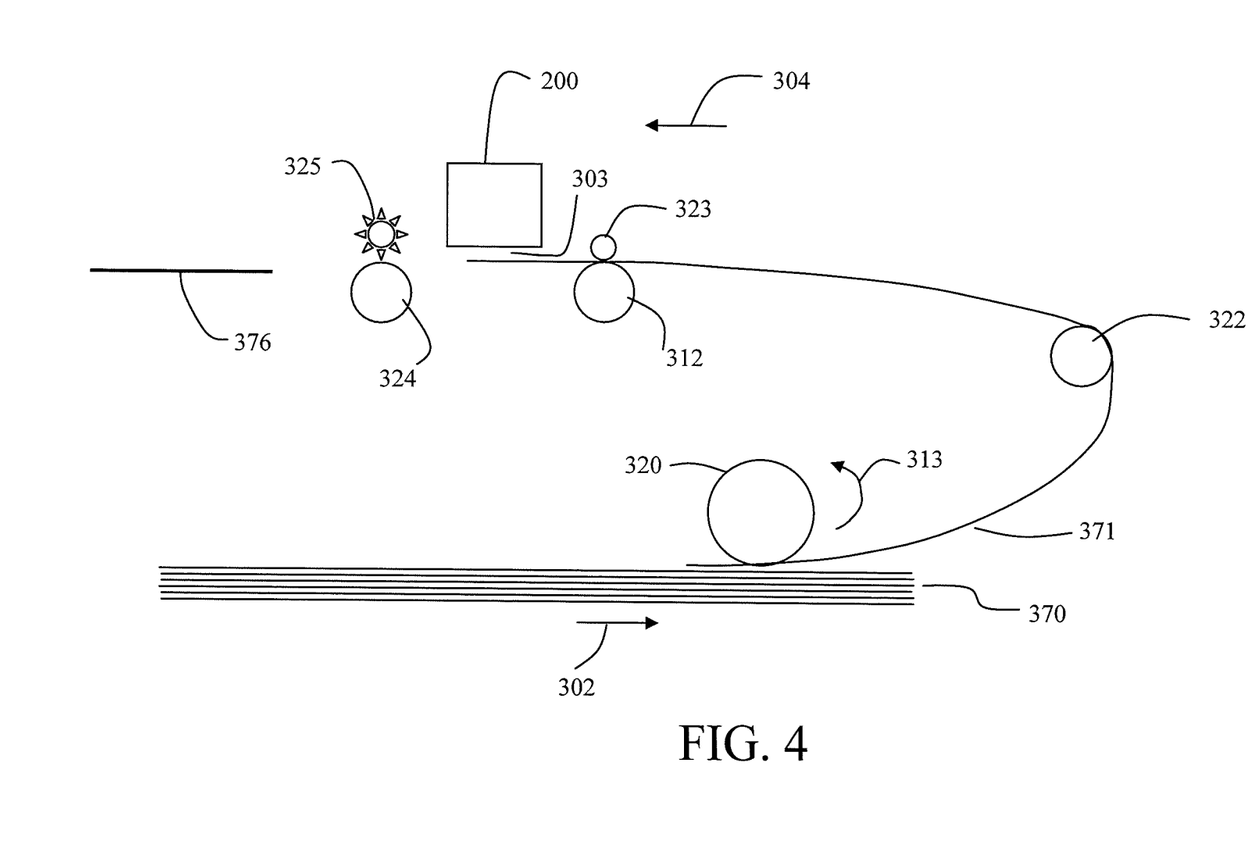
FIG. 4 is a schematic side view of an exemplary paper path in a carriage printer.

A variety of rollers are used to advance the medium through a media advance system of the printer as shown schematically in the side view of FIG. 4. In this example, a pick-up roller 320 moves a top piece or sheet 371 of a stack 370 of paper or other recording medium 20 in the direction of arrow, a paper load entry direction 302. A turn roller 322, acts to move the paper around a C-shaped path (in cooperation with a curved rear wall surface) so that the paper continues to advance along a media advance direction 304 (see FIG. 3) from a rear of the printing mechanism 309 (see FIG. 3). The paper is then moved by a feed roller 312 and an idler roller(s) 323 to advance along the Y axis across the print region 303, and from there to a discharge roller 324 and star wheel(s) 325 so that printed paper exits along the media advance direction 304 to a media output holder 376. The feed roller 312 includes a feed roller shaft along its axis, and a feed roller gear 311 (FIG. 3) is mounted on the feed roller shaft. The feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller. The media advance system is defined as any combination of the above described rollers or other paper transport devices such as belts, wheels and the like. It is understood by those skilled in the art that at least one motor will drive the rollers.

The motor that powers the paper advance rollers is not shown in FIG. 3, but a hole 310 at the right side of the printing mechanism 306 is where the motor gear (not shown) protrudes through in order to engage the feed roller gear 311, as well as the gear (not shown) for the discharge roller 324. For normal paper pick-up and feeding, it is desired that all rollers rotate in a forward rotation direction 313. Toward the left side of the printing mechanism 307, in the example of FIG. 3, is a maintenance station 330.

Toward the rear of the printing mechanism 309, in this example, is located an electronics board 390, which includes cable connectors 392 for communicating via cables (not shown) to the printhead carriage 200 and from there to the printhead 250. Motor controllers for the carriage motor 380 and for the paper advance motor are also typically mounted on the electronics board 390, a clock for measuring elapsed time, a processor and other control electronics (shown schematically as the controller 14 and the image processing unit 15 in FIG. 1) for controlling the printing process, and an optional connector for a cable to a host computer.

Figure 5:
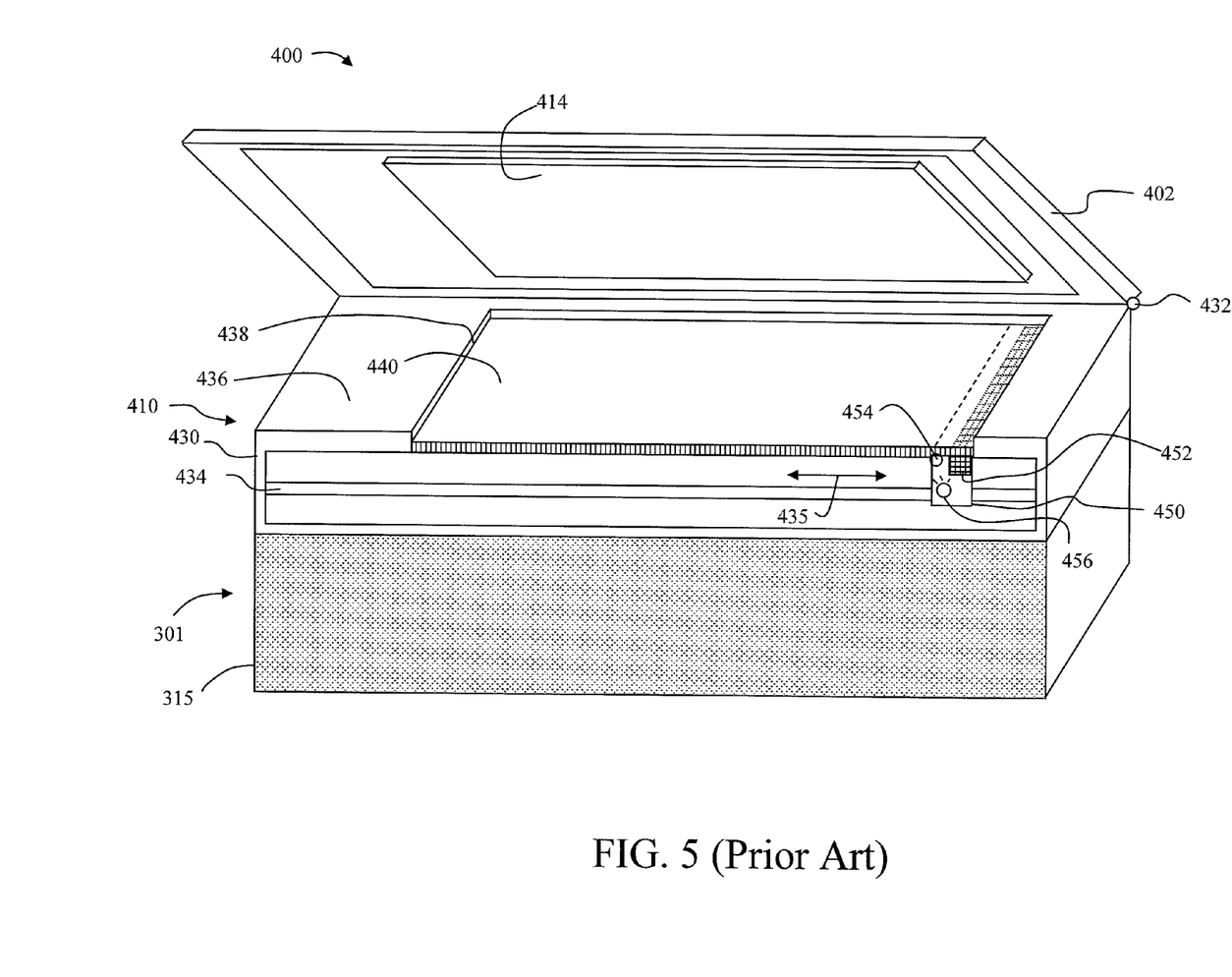
FIG. 5 is a perspective of a multifunction printer having a conventional prior art scanning apparatus.

FIG. 5 shows a perspective of a multifunction printer 400 having a printing apparatus 301 including a printing mechanism for printing images, such as a printing mechanism 300 (FIG. 3), enclosed within a housing 315, and also a prior art scanning apparatus 410 for scanning documents or other items. In this view, the front portion of the scanning apparatus 410 is cut away in order to show internal features of the scanning apparatus 410 more clearly. The multifunction printer 400 can do printing, scanning of documents, or copying of documents (i.e. printing plus scanning).

The prior art scanning apparatus 410 includes a scanning apparatus body 430 and the lid 402, which is pivotably attached to the scanning apparatus body 430 by a hinge 432. The surface of the scanning apparatus body 430 that is covered by the lid 402 when the lid 402 is closed includes a frame 436. A transparent platen 440 (typically a flat piece of glass) is inset within the frame 436. In the example shown in FIG. 5, the surface of the transparent platen 440 is lower than the surface of the frame 436 so that there is an offset 438. The transparent platen 440 is not covered by the lid 402 when the lid 402 is open as it is in FIG. 5.

Below the transparent platen 440 is a movable sensor array module 450. In the example shown in FIG. 5, the sensor array module 450 includes a photosensor array 452 (such as a contact image sensor) extending the width of the transparent platen 440, a roller 454 that is biased into contact with the underside of the transparent platen 440, and a light source 456 that illuminates a scan line of a document or other item (not shown) that is placed on top of the transparent platen 440. A light guide and other optics (not shown) can also be included in the sensor array module 450. The sensor array module 450 is moved back and forth along a scanning guide 434 in a scanning direction 435 across the length of the transparent platen 440 in order to scan the document or other item, receiving reflected light from the item through the transparent platen 440 scan line by scan line and converting the reflected light into electrical signals. A controller (not shown) converts the electrical signals into digitized data to form a digitized image of the item. The scanning guide 434 can be a round rail, a rack and pinion or other guiding member that can use the power of a motor (not shown) to provide a linear motion along the scanning direction 435.

In the example shown in FIG. 5, the lid 402 includes a reflective backing plate 414. The thickness of the reflective backing plate 414 is accommodated in an offset 438 between a frame 436 and the top surface of a transparent platen 440 when the scanner lid 402 is closed. The reflective backing plate 414 can be resiliently mounted on the lid 402 so that the reflective backing plate 414 is effective in pressing documents of various thicknesses against the transparent platen 440. Typically the reflective backing plate 414 is white in the document scanning region. In some scanning apparatus configurations (not shown), the reflective backing function is integrated into the lid 402.

Figure 6:
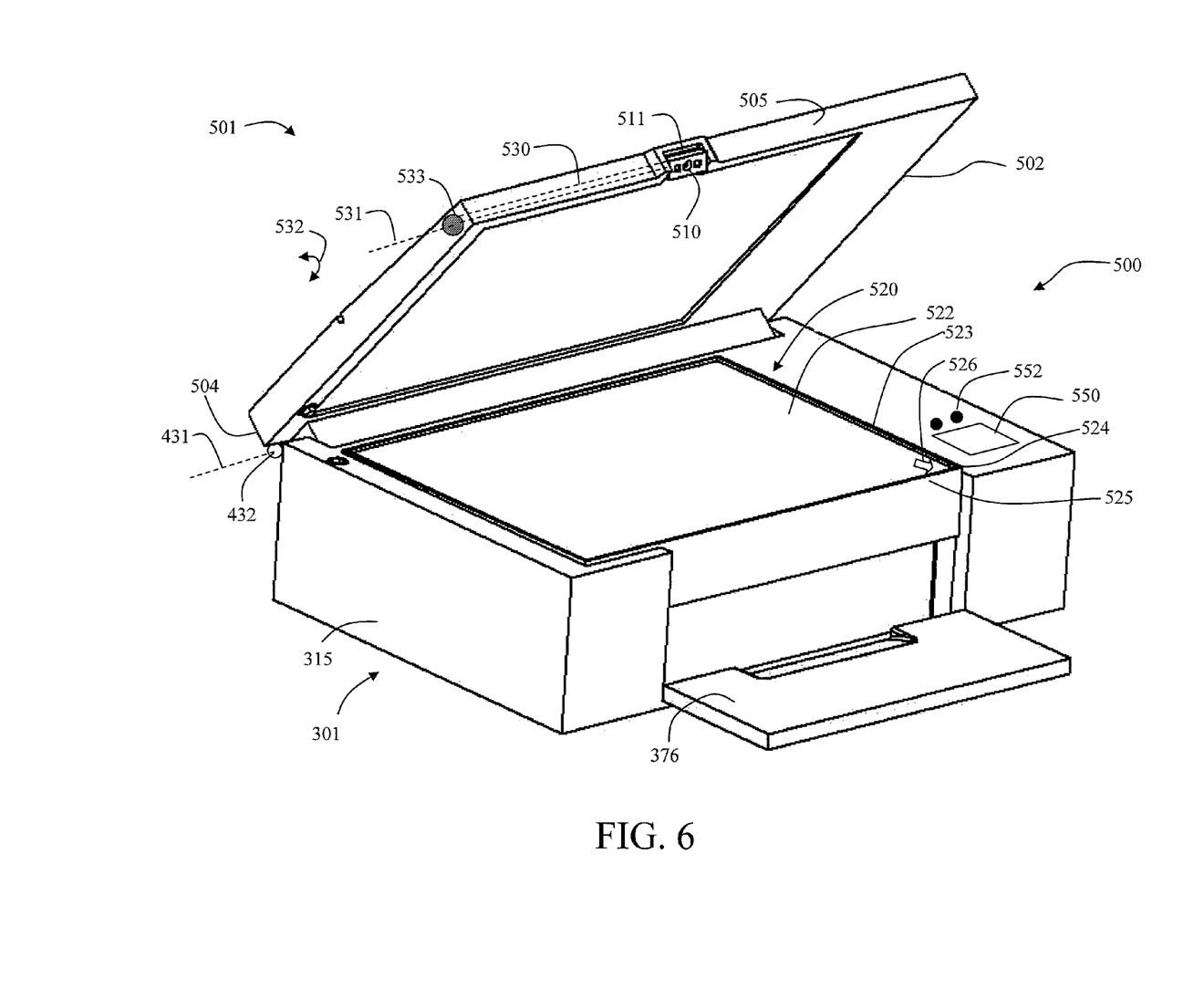
FIG. 6 is a perspective of a multifunction printer having an image capture apparatus including a camera mounted on a lid according to an embodiment of the invention.

FIG. 6 shows a perspective of a multifunction printer 501, according to an embodiment of the present invention, in which image capture apparatus 500 replaces the prior art scanning apparatus 410 shown in FIG. 5. The image capture apparatus 500 has some similarities in appearance to the prior art scanning apparatus 410, including a lid 502 that opens and closes. However, the scanning components below the transparent platen 440 in FIG. 5 are replaced by a camera 510 that is pivotably affixed to the lid 502 in the embodiment shown in FIG. 6. The camera 510 is any digital camera capable of capturing still or video images. The camera 510 includes at least a two dimensional sensor array (not shown), and preferably the camera 510 can be networked. The transparent platen 440 of FIG. 5 is replaced by an image capture platform 520 (typically opaque) in the embodiment shown in FIG. 6. Rather than having the sensor array module 450 that moves below the transparent platen 440 as in the prior art scanning apparatus 410 to scan a document or other object while looking up at it (so that the document should be placed on the transparent platform 440 image side down), the image capture apparatus 500 of the embodiment of FIG. 6 includes the camera 510 that is stationary during image capture and looks down at the document or other object so that a document should be placed on the image capture platform 520 with image side up. A document or other object of which an image is to be captured is placed on a holding surface 522 of the image capture platform 520. The image capture platform 520 can include a frame 525 having a lip 523 that extends above the holding surface 522. The frame 525 can help define where the document or object is to be placed. For example, a document can be aligned against the lip 523 at a corner 524 of the frame 525. In addition to the lip 523 at the corner 524, an additional type of alignment feature is a marker 526.

The lid 502 is pivotably attached to a housing 315 by a hinge 432 having an axis 431. The lid 502 has a closed position (see FIG. 9) in which the lid 502 is next to the image capture platform 520, and an open position (FIG. 6) in which the lid 502 is away from the image capture platform 520. In the embodiment shown in FIG. 6, the camera 510 is mounted on a mount 511 that is pivotably affixed to the lid 502 by a shaft 530. The shaft 530 has an axis 531 that is parallel to the axis 431 of the hinge 432. Therefore, the camera 510 is pivotable in pivot direction 532 about the axis 531 that is parallel to the axis 431 of the hinge 432. In the embodiment shown in FIG. 6, the camera 510 can be manually pivoted by turning a knob 533. Optionally, one can pivot the camera mount 511 directly. The hinge 432 is disposed at a first edge 504 of the lid 502, and the camera 510 is disposed near a second edge 505 of the lid 502 opposite the first edge 504. When the lid 502 is raised by different amounts, the camera 510 is raised to different heights above the image capture platform 520. At different positions of the lid 502, the camera 510 can require pivoting about the axis 531 so that the image capture platform 520 is in the field of view of the camera 510.

Figure 7:
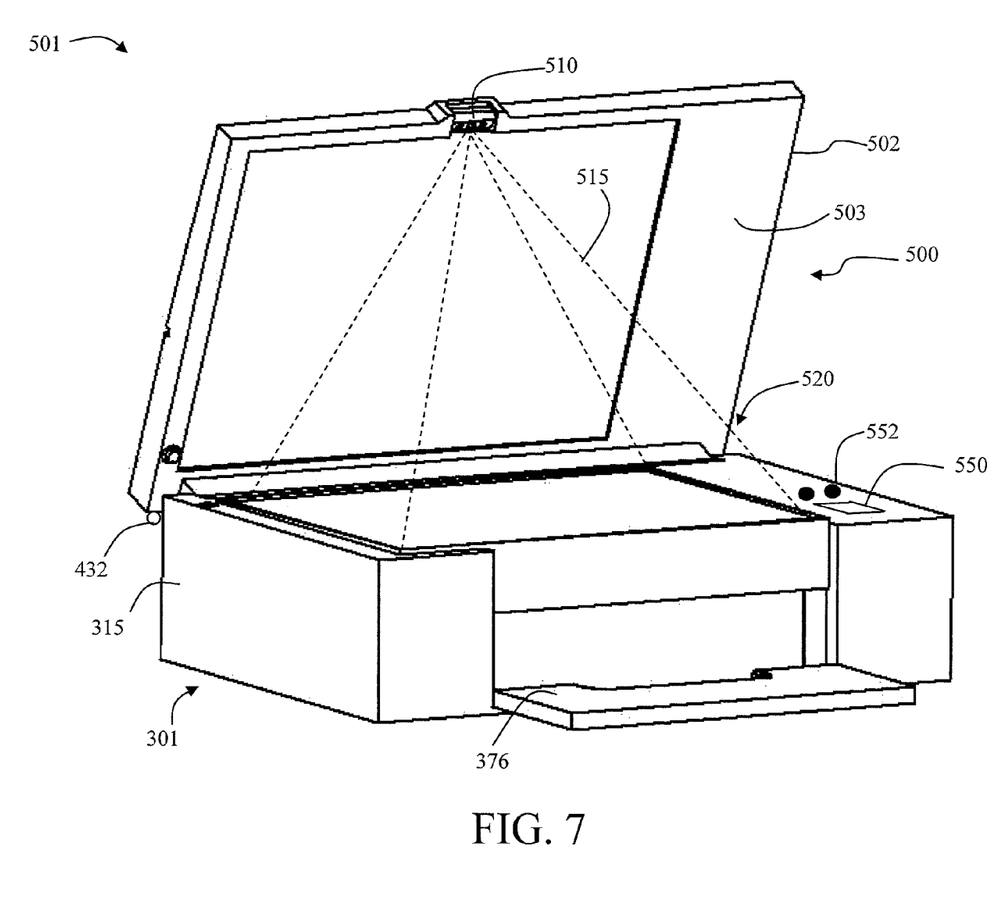
FIG. 7 is a perspective of the multifunction printer of FIG. 6 with a field of view of the camera directed toward an image capture platform.
Figure 8:
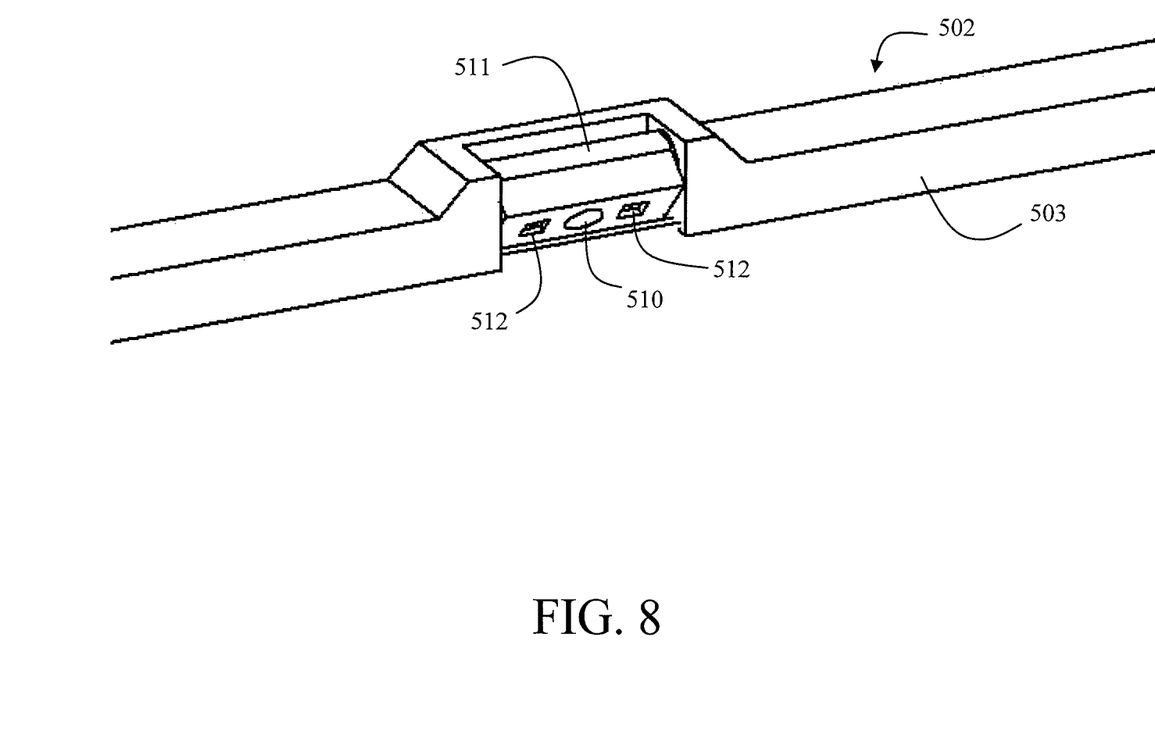
FIG. 8 is a close-up view of the camera in its orientation relative to the lid corresponding to the open lid configuration of FIG. 7.

In FIG. 6, the camera 510 is not oriented such that its field of view includes the image capture platform 520. In FIG. 7 the camera 510 has been pivoted such that its field of view indicated by dashed lines 515 does include image capture platform 520. Optionally, the hinge 432 may be a friction hinge with a detent (not shown) to hold the lid 502 at a preferred extent of opening for positioning the camera 510. Comparing FIG. 7 with the close-up view of the camera 510 shown in FIG. 8, it can be seen in this example that in order to have the field of view of the camera 510 include the image capture platform 520, the camera 510 and the camera mount 511 have been pivoted such that they are at an angle of about 45 degrees with respect to an underside 503 of the lid 502. Also shown in the close-up view of FIG. 8 are two light emitting diodes 512 that are mounted on either side of the camera 510 on the pivotable mount 511. Other types or locations of light source for illuminating the field of view of the camera 510 are also contemplated, but the light emitting diodes 512 mounted on the same pivotable mount 511 as the camera 510 provide a compact and energy efficient design.

Figure 13:
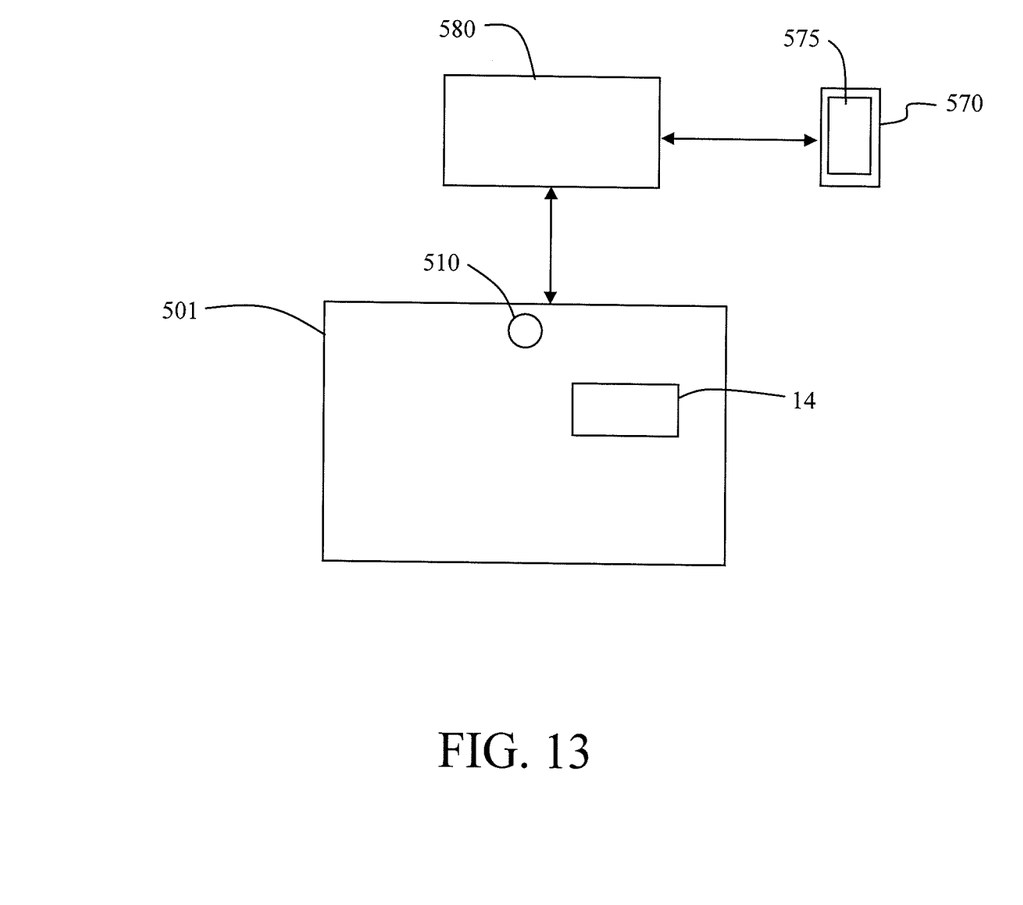
FIG. 13 is a schematic of the multifunction printer connected over a network to a mobile communication device.

Referring back to FIG. 6, there is shown a display 550 and control buttons 552. In some embodiments, the display 550 is a touch screen and some or all of the buttons 552 are incorporated into the display 550. In an image capture mode, the display 550 can show a view of the image. Alternatively, a view of the image can be displayed on the display of a host computer (not shown) or a display 575 of a networked computing device such as a mobile communication device 570 (see FIG. 13). The terms "networked computing device" and "mobile communication device", as used herein, are meant to include, but not limited to, a smart phone, tablets, laptop computers and the like. Image capture can be initiated by pushing one of the control buttons 552 (see FIGS. 6 and 7), or by sending a command from the host computer or the mobile communication device 570. In some embodiments and referring to FIG. 13, the multifunction printer 501 is connected to a network 580 either wirelessly or through cables. In some embodiments the camera 510 can also be connected directly to network 580, or it can be connected to a network 580 through the controller 14 (FIGS. 1 and 13). In some embodiments, the camera 510 is a webcam that can capture and transmit video images.

Figure 9:
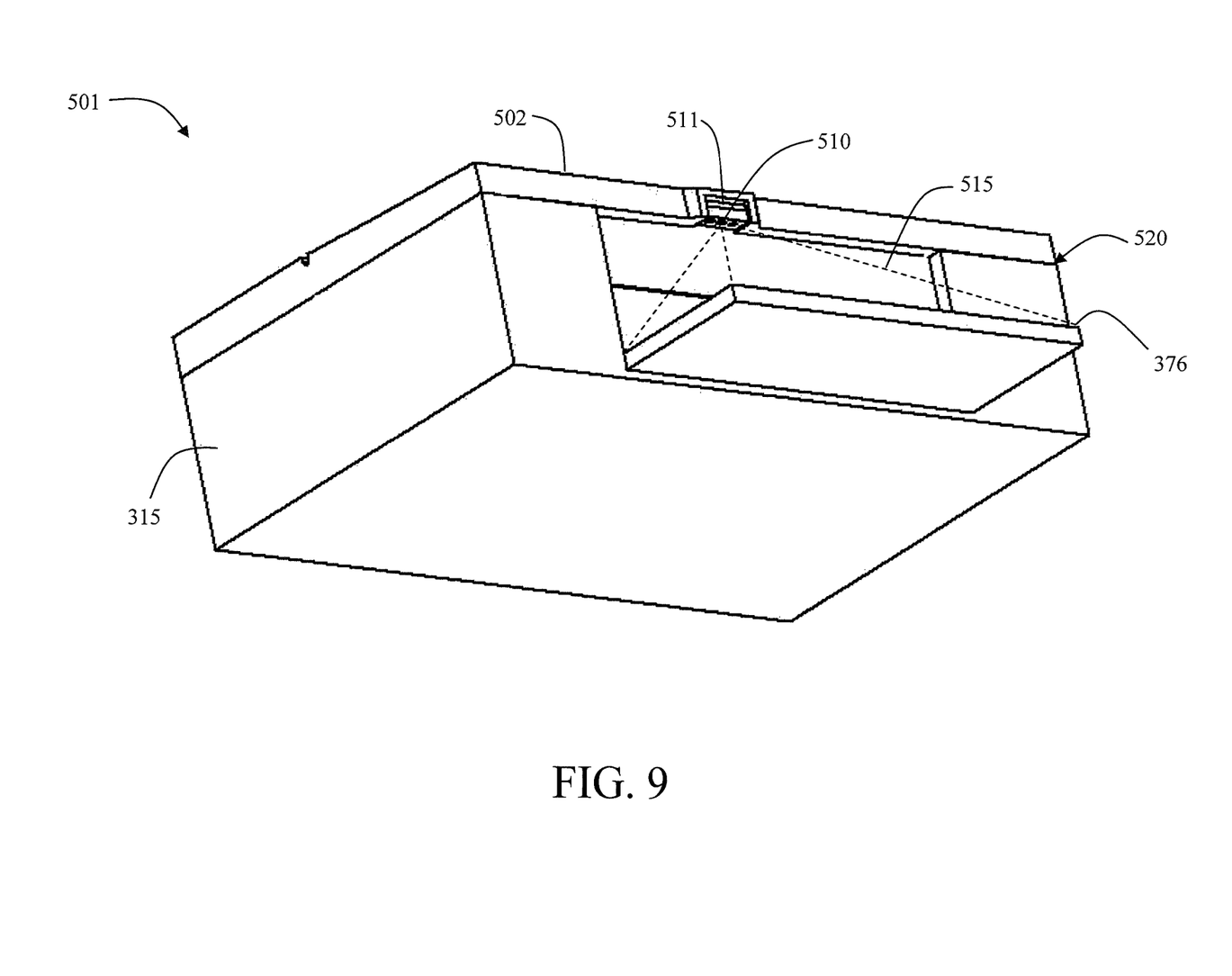
FIG. 9 is a bottom perspective of the multifunction printer of FIG. 6 with the lid closed and the field of view of the camera directed toward a media output holder.
Figure 10:
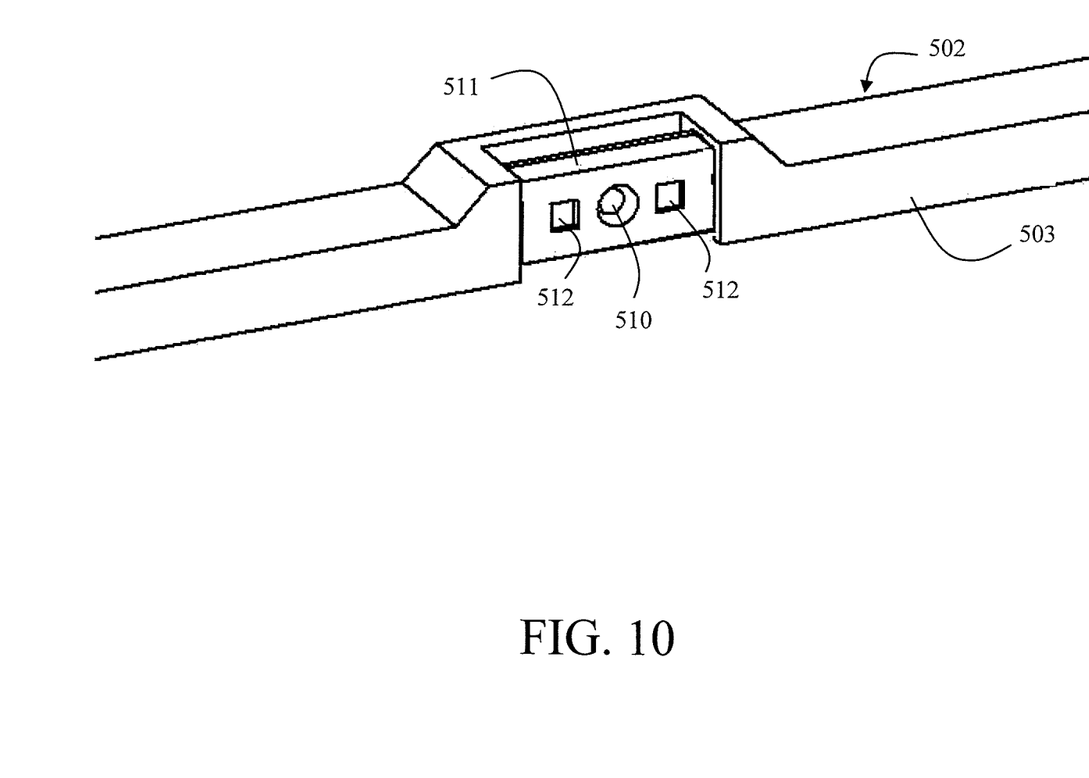
FIG. 10 is a close-up view of the camera in its orientation relative to the lid corresponding to the closed lid configuration of FIG. 9.

The multifunction printer 501 also includes a printing apparatus 301 that is largely hidden from view in FIGS. 6 and 7 by housing 315. The printing apparatus 301 can include a printer chassis 300 as described above relative to FIG. 3. One feature of the printing apparatus 301 that is shown in FIGS. 6 and 7 is the media output holder 376 that holds printed sheets of media downstream of print region 303 as described above relative to FIG. 4. As shown in FIG. 9, when the lid 502 is in its closed position next to the image capture platform 520, a field of view of the camera 510 (indicated by the dashed lines 515) includes a portion of the media output holder 376, or alternatively a portion of the printing apparatus 301 that is disposed between the print region 303 (FIG. 4) and the media output holder 376. In this way, the camera 510 can monitor whether printed sheets are advanced past the print region 303, thereby verifying that a print job is completed successfully, as described in further detail below. Comparing FIG. 9 and the close-up view of camera 510 in FIG. 10, it can be seen in this example that in order to have the field of view of the camera 510 include the media input holder 376 with the lid 502 in its closed position, the camera 510 and the mount 511 have been pivoted such that they are parallel to or substantially parallel to the underside 503 of the lid 502.

Figure 11:
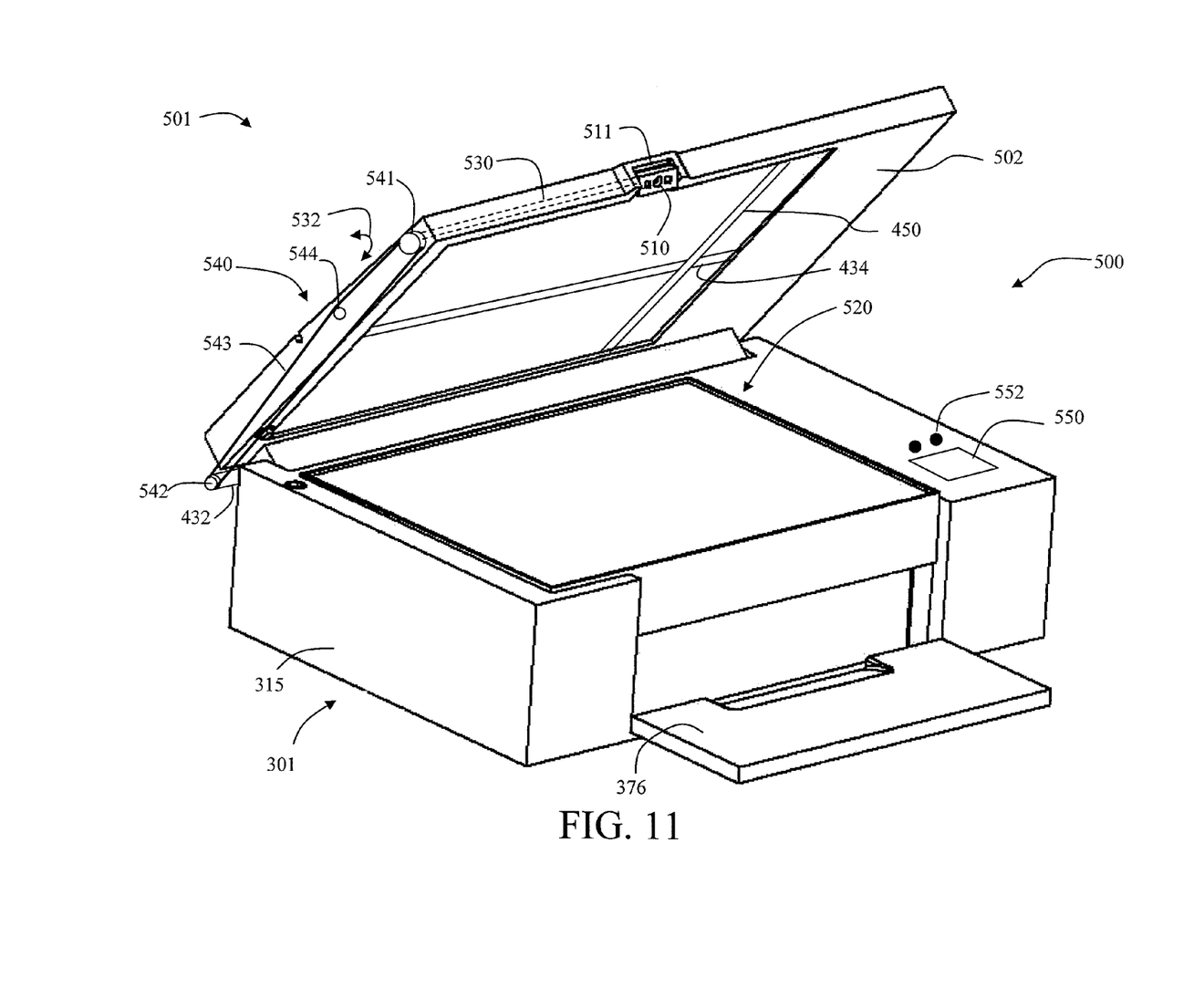
FIG. 11 is a perspective of an embodiment of a multifunction printer including a belt and pulley transmission mechanism for pivoting the camera as the lid opens or closes.
Figure 12:
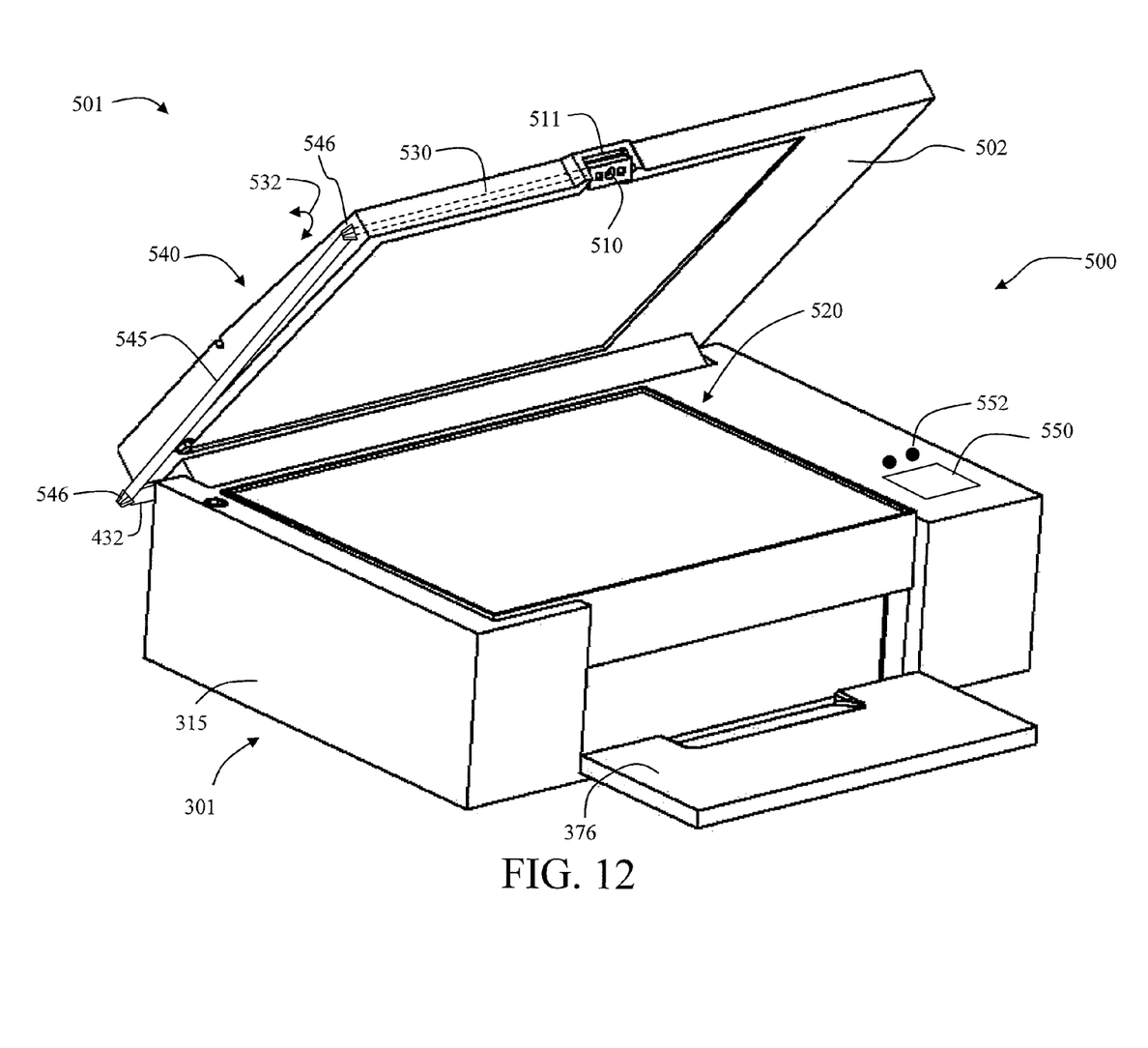
FIG. 12 is a perspective of an embodiment of a multifunction printer including a gear and gear shaft transmission mechanism for pivoting the camera as the lid opens or closes.

Manual pivoting of the camera 510 and the mount 511 was described above relative to FIG. 6. In some embodiments, as shown in the examples of FIGS. 11 and 12, a transmission mechanism 540 is connected between the hinge 432 and the camera 510 for orienting the field of view of the camera 510 as the lid 502 is opened or closed. In the example shown in FIG. 11, the transmission mechanism 540 preferably includes a first pulley 541 affixed to the shaft 530 that is attached to the mount 511, a second pulley 542 that is attached to the hinge 432 and a belt 543 that goes around the first pulley 541 and the second pulley 542. In some embodiments, the second pulley 542 can include a groove around the hinge 432 rather than being a separate device. As the lid 502 is raised or lowered in the pivot direction 532, the transmission mechanism 540 causes the shaft 530 to turn, thereby pivoting the mount 511 and the camera 510. The first pulley 541 can be sized differently than the second pulley 542 in order to cause the camera 510 to pivot by a different angle than the lid 502. Optionally, transmission mechanism 540 is disengageable. For example, if a belt tensioner 544 is pushed against the belt 543 so that the belt 543 is somewhat tightly wrapped around the first pulley 541 and the second pulley 542, the transmission mechanism 540 is engaged so that opening or closing the lid 502 causes the camera 510 to pivot as described above. However, if the belt tensioner 544 is moved away from the belt 543 so that the belt 543 has slack and is only loosely wrapped around the first pulley 541 and the second pulley 542, the transmission mechanism 540 is disengaged so that opening or closing the lid 502 does not cause the camera 510 to pivot. Pivoting of the camera 510 can still be done manually.

Also shown in FIG. 11 is a sensor array module 450 that can be built into the lid 502 in some embodiments. As in the prior art scanning apparatus 410 of FIG. 5, the sensor array module 450 can be moved along the scanning guide 434 to scan a document while the lid 502 is closed. However, instead of the sensor array module 450 looking up at a document through a transparent platen 440 as in FIG. 5, in the embodiment shown in FIG. 11 the sensor array module 450 would look down at a document, so that the side of the document to be scanned should be face up. This sensor array module 450 may be used in certain circumstances, for example, where the document to be scanned tends to be curled and needs to be held flat.

In the example shown in FIG. 12, the transmission mechanism 540 preferably includes a gear shaft 545 with bevel gears 546 at each end. (The bevel gear 546 at the end of the gear shaft 545 near the shaft 530 is hidden in this view). The shaft 530 has the bevel gear 546 at its end that engages with the hidden bevel gear 546 on gear shaft 545. The bevel gear 546 (hidden in this view) is also attached to the hinge 432 and engages with the visible bevel gear 546 on the gear shaft 545. The gear shaft 545 and bevel gears 546 transmit the pivoting action of the hinge 432 to the shaft 530 in order to pivot the camera 510 as the lid 502 is open or closed. The transmission mechanism 540 is illustrated above as having several components; however, any combination of the above components as well as suitable substitutes for any of the components is within the scope of the transmission mechanism 540 as defined herein.

Having described the features of the multifunction printer 501 with the image capture apparatus 500, a context is provided for describing a method of operation. The multifunction printer 501 has a first mode of operation that typically requires the presence of an operator. The operator opens the lid 502 and positions the camera 510 to view the image capture platform 520. The camera 510 can be pivoted automatically so that the image capture platform 520 is in its field of view for embodiments having the transmission mechanism 540. Alternatively, the camera 510 can be manually pivoted while the operator observes images from the camera 510, for example on display 550. The operator then places a document or other object on image capture platform 520 and presses the control button 552 or sends a command to initiate image capture by the camera 510. The captured image can be stored in memory or it can be printed using the printing apparatus 301 of the multifunction printer 501. Optionally, the object is illuminated by the light emitting diodes 512 (or similar light source) during image capture.

The multifunction printer 501 also has a second mode of operation where documents can be printed by the printing apparatus 301 where the print job is sent remotely and the operator is not present with the multifunction printer 501. In this mode multifunction printer 501 is connected to the network 580. Also a computing device, such as a computer or the mobile communication device 570 is connected to the network 580. A print job is sent remotely from the computing device to the multifunction printer 501 over the network 580. The printing apparatus 301 of the multifunction printer 501 prints the print job by advancing the sheet 371 of print media to the print region 303, printing on a portion of the sheet of media that is proximate the print region 303, and advancing the printed sheet 371 to the media output holder 376. The camera 510 monitors an operation of the printing apparatus 301 using the camera 510 and the display 575 of the networked computing device such as the mobile communication device 570. Since printing is typically done with the lid 502 in its closed position, a field of view of the camera 510 is directed downstream of the print region 303. The camera 510 can be instructed to capture images during printing by the controller 14 or by the networked computing device such as the mobile communication device 570. A still image or a sequence of video images can be sent over the network 580 to the computing device such the mobile communication device 570. While the camera 510 is capturing images of the region downstream of the print region 303, it can be advantageous to illuminate the field of view of the camera 510 using a light source such as the light emitting diodes 512. This is particularly true when printing jobs are sent remotely and the lights are off in the room where multifunction printer 501 is kept. In the case where the camera 510 is a webcam and video is sent to the networked computing device, such as the mobile communication device 570, a sequence of images can be provided showing the sheet 371 of media advancing toward the media output holder 376. Optionally, the image or images can be immediately displayed on the display 575 of the networked computing device, such as the mobile communication device 570. Alternatively, a message can be sent to the networked computing device, such as the mobile communication device 570, that the image or images are ready for viewing.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
250 Printhead
251 Printhead die
253 Nozzle array
254 Nozzle array direction
256 Encapsulant
257 Flex circuit
258 Connector board
262 Multi-chamber ink supply
264 Single-chamber ink supply
300 Printing mechanism
301 Printing apparatus

PART LIST CONTINUED

302 Paper load entry direction
303 Print region
304 Media advance direction
305 Carriage scan direction
306 Right side of printing mechanism
307 Left side of printing mechanism
308 Front of printing mechanism
309 Rear of printing mechanism
310 Hole (for paper advance motor drive gear)
311 Feed roller gear
312 Feed roller
313 Forward rotation direction (of feed roller)
315 Housing
320 Pick-up roller
322 Turn roller
323 Idler roller
324 Discharge roller
325 Star wheel(s)
330 Maintenance station
344 Display
370 Stack of paper (media)
371 Sheet
376 Media output holder
380 Carriage motor
382 Carriage guide rail
383 Encoder fence
384 Belt
390 Printer electronics board 392 Cable connectors
400 Multifunction printer
402 Lid

PARTS LIST CONTINUED

410 Scanning apparatus
414 Reflective backing plate
430 Body (of scanning apparatus)
431 Axis of hinge
432 Hinge
434 Scanning guide
435 Scanning direction
436 Frame
438 Offset
440 Transparent platen
450 Sensor array module
452 Photosensor array
454 Roller of sensor array module
456 Light source
500 Image capture apparatus
501 Multifunction printer
502 Lid
503 Underside (of lid)
504 First edge
505 Second edge
510 Camera
511 Mount
512 LED
515 Dashed line (field of view indicator)
520 Image capture platform
522 Holding surface
523 Lip
524 Corner
525 Frame
526 Marker

PART LIST CONTINUED

530 Shaft
531 Axis
532 Pivot direction
533 Knob
540 Transmission mechanism
541 First pulley
542 Second pulley
543 Belt
544 Belt tensioner
545 Gear shaft
546 Bevel gear
550 Display
552 Button(s)
570 Mobile communication device
575 Display
580 Network
d distance

The invention claimed is:

1. A multifunction printer comprising:
    an image capture apparatus including:
        an image capture platform for holding an object of which an image is to be captured;
        a lid having a closed position in which the lid is proximate the image capture platform, and an open position in which the lid is away from the image capture platform; and
        a camera pivotably affixed to the lid; and
    a printing apparatus including:
        a media advance system for advancing a sheet of media to a print region;
        a printhead;
        a housing and a hinge for pivotably attaching the lid to the housing, wherein the hinge is disposed at a first edge of the lid, and wherein the camera is disposed proximate a second edge of the lid opposite the first edge; and
        a transmission mechanism connected between the hinge and the camera for orienting a field of view of the camera as the lid is opened or closed; wherein the transmission mechanism is disengageable.

2. The multifunction printer of claim 1 is connectable to a network, wherein the camera is connectable to the network.

3. The multifunction printer of claim 2, wherein the camera is a webcam.

4. The multifunction printer of claim 1, wherein the camera is pivotable about an axis that is parallel to an axis of the hinge.

5. The multifunction printer of claim 1, wherein the transmission mechanism includes a pulley and a belt.

6. The multifunction printer of claim 1, wherein the transmission mechanism includes a gear and a shaft.

7. The multifunction printer of claim 1, further comprising a light source for illuminating the field of view of the camera.

8. The multifunction printer of claim 1, further comprising a pivotable mount, wherein the camera and the light source are disposed on the pivotable mount.

9. A multifunction printer comprising:
    an image capture apparatus including:
        an image capture platform for holding an object of which an image is to be captured;
        a lid having a closed position in which the lid is proximate the image capture platform, and an open position in which the lid is away from the image capture platform; and
        a camera that is pivotably affixed to the lid; and
    a printing apparatus including:
        a media advance system for advancing a sheet of media to a print region; and
        a printhead;
    wherein the lid includes a sensor array module and a scanning guide build into the lid for scanning documents.

10. The multifunction printer of claim 9, wherein when the lid is in the open position, and a field of view of the camera includes the image capture platform.

11. The multifunction printer of claim 9, wherein the camera is manually pivotable.

12. The multifunction printer of claim 9, wherein the image capture platform is opaque.

13. The multifunction printer of claim 9, wherein the image capture platform includes alignment features.

14. The multifunction printer of claim 9, further comprising a display configured to display images captured by the camera.

15. The multifunction printer of claim 9, further comprising a light source for illuminating a field of view of the camera.

16. The multifunction printer of claim 15, further comprising a pivotable mount, wherein the camera and the light source are disposed on the pivotable mount.

* * * * *